United States Patent
Krishna et al.

(10) Patent No.: US 9,244,713 B1
(45) Date of Patent: Jan. 26, 2016

(54) METHOD AND SYSTEM FOR SORTING AND BUCKETIZING ALERTS IN A VIRTUALIZATION ENVIRONMENT

(71) Applicant: Nutanix, Inc., San Jose, CA (US)

(72) Inventors: Kothuri Venkata Vamsi Krishna, San Jose, CA (US); Rajesh P. Bhatt, San Jose, CA (US)

(73) Assignee: NUTANIX, INC., San Jose, CA (US)

(*) Notice: Subject to any disclaimer, the term of this patent is extended or adjusted under 35 U.S.C. 154(b) by 63 days.

(21) Appl. No.: 14/276,849

(22) Filed: May 13, 2014

(51) Int. Cl.
*G06F 9/455* (2006.01)
*H04L 29/08* (2006.01)
*G06F 9/50* (2006.01)
*H04L 29/06* (2006.01)

(52) U.S. Cl.
CPC .......... *G06F 9/45533* (2013.01); *G06F 9/5077* (2013.01); *H04L 29/06891* (2013.01); *H04L 29/08072* (2013.01)

(58) Field of Classification Search
CPC .............. G06F 9/45533; G06F 9/5077; H04L 29/08072; H04L 29/06891
See application file for complete search history.

(56) References Cited

U.S. PATENT DOCUMENTS

| | | | | |
|---|---|---|---|---|
| 6,070,244 A * | 5/2000 | Orchier | G06F 21/6218 | 709/223 |
| 6,446,058 B1 * | 9/2002 | Brown | G06N 5/045 | 379/9 |
| 6,690,274 B1 * | 2/2004 | Bristol | G05B 23/0267 | 340/506 |
| 6,704,874 B1 * | 3/2004 | Porras | H04L 12/2602 | 709/224 |
| 6,988,208 B2 * | 1/2006 | Hrabik | H04L 63/1433 | 709/208 |
| 7,111,129 B2 * | 9/2006 | Percival | G06F 12/0813 | 711/113 |
| 7,159,237 B2 * | 1/2007 | Schneier | G06F 21/552 | 709/223 |
| 7,171,689 B2 * | 1/2007 | Beavers | G06F 11/0709 | 714/E11.025 |
| 7,376,969 B1 * | 5/2008 | Njemanze | G06F 21/55 | 709/224 |
| 7,379,993 B2 * | 5/2008 | Valdes | H04L 41/142 | 709/224 |
| 7,506,373 B2 * | 3/2009 | Morin | G06Q 20/0855 | 340/566 |
| 7,810,157 B2 * | 10/2010 | Morin | H04L 43/12 | 709/223 |
| 8,104,033 B2 * | 1/2012 | Chiaramonte | G06F 9/5077 | 718/1 |
| 8,161,321 B2 * | 4/2012 | Zheng | G06F 11/1466 | 707/674 |
| 8,255,907 B2 * | 8/2012 | Chiaramonte | G06F 9/5077 | 718/1 |
| 8,359,594 B1 * | 1/2013 | Davidson | G06F 9/5077 | 709/218 |
| 8,996,814 B2 * | 3/2015 | Peinado | G06F 12/126 | 711/133 |

OTHER PUBLICATIONS

Julisch "Clustering Intrusion Detection Alarms to Support Root Cause Analysis", 2003 ACM, 29 pages.*

(Continued)

*Primary Examiner* — Van Nguyen
(74) *Attorney, Agent, or Firm* — Vista IP Law Group, LLP (57) ABSTRACT

An architecture for sorts and bucketizes alerts in a virtualization environment. A plurality of alerts associated with virtual machines in the virtualization environment is received. A plurality of attributes is identified for the virtual machines, and a plurality of buckets defined for each attribute, into which the received alerts are assigned. The buckets for each attribute are then sorted. The attributes may also be sorted based upon the distribution of alerts in the buckets of the attribute, allowing a system administrator or other personnel to more easily determine which attributes of the virtual machines are correlated with the received alerts, in order to identify potential causes and solutions for the alerts in the virtualization environment.

27 Claims, 9 Drawing Sheets

(56) References Cited

OTHER PUBLICATIONS

Li et al. "Cooperative Alert Topic Detection Model in Distributed Environment", 2009 IEEE, pp. 254-259.*

Siraj et al. "Multi-Level Alert Clustering for Intrusion Detection Sensor Data", 2005 IEEE, pp. 748-753.*

Lai "An Early Warning Model for Risk Management of Securities Based on the Error Inverse Propagation Neural Network", 2005 IEEE, pp. 379-396.*

* cited by examiner

| Alert ID | VM ID | Alert Lvl. | Time Received | Cause | Resolution | Related Text |
|---|---|---|---|---|---|---|
| 0001 | 0105 | Red | Jan 1, 2:00pm | Low memory | Get more memory | ... |
| 0002 | 1036 | Red | Jan 1, 2:05pm | Data Corruption | Ignore | ... |
| 0003 | 0043 | Yellow | Jan 1, 3:15pm | ... | ... | ... |
| ... | ... | ... | ... | ... | ... | ... |

FIG. 3

| Attribute Name (per VM) | Attribute Buckets |
|---|---|
| Operating System | Windows, Linux, Mac OS,... |
| Host | host1, host2,... |
| Host Location | Los Angeles, New York,... |
| Memory | 0-2GB, 2-4GB, 4-6GB,... |
| # of VMs on host | 0-50, 100-125,... |
| CPU capacity | 0-100MHz, 100-200MHz,... |
| Storage capacity | 0-500GB, 500-750GB, 750GB-1TB,... |
| Failure Mode | Low memory, data corruption,... |
| Power status | on, off |

FIG. 4

| Attribute Name (per VM) | Buckets (# of errors / # of VMs in bucket) | | | | | |
|---|---|---|---|---|---|---|
| Host | Host4 (525 / 550) | Host1 (5 / 300) | Host6 (1 / 200) | ... | ... | ... |
| Memory | 2-4GB (300 / 400) | 4-6GB (145 / 400) | 0-2GB (80 / 350) | | | |
| Operating System | Mac OS (145 / 300) | Windows (140 / 500) | Linux (100 / 375) | | | |
| ... | | | | | | |

FIG. 5A

| Attribute Name (per VM) | Buckets (# of errors / # of warnings / # of VMs in bucket) | | | |
|---|---|---|---|---|
| Host | Host4 (525 / 15 / 550) | Host1 (5 / 50 / 300) | Host6 (1 / 40 / 200) | ... |
| Memory | 2-4GB (300 / 40 / 400) | 4-6GB (145 / 30 / 400) | 0-2GB (80 / 30 / 350) | ... |
| Operating System | Mac OS (145 / 25 / 300) | Windows (140 / 50 / 500) | Linux (100 / 30 / 375) | ... |
| ... | | | | |

METHOD AND SYSTEM FOR SORTING AND BUCKETIZING ALERTS IN A VIRTUALIZATION ENVIRONMENT

CROSS REFERENCE TO RELATED APPLICATIONS

The present application is related to U.S. Pat. No. 8,601,473, entitled "ARCHITECTURE FOR MANAGING I/O AND STORAGE FOR A VIRTUALIZATION ENVIRONMENT", U.S. patent application Ser. No. 13/207,357, entitled "METADATA FOR MANAGING I/O AND STORAGE FOR A VIRTUALIZATION ENVIRONMENT", U.S. Pat. No. 8,549,518, entitled "METHOD AND SYSTEM FOR IMPLEMENTING A MAINTENANCE SERVICE FOR MANAGING I/O AND STORAGE FOR A VIRTUALIZATION ENVIRONMENT", U.S. patent application Ser. No. 13/207,371, entitled "METHOD AND SYSTEM FOR IMPLEMENTING WRITABLE SNAPSHOTS IN A VIRTUALIZED STORAGE ENVIRONMENT", and U.S. patent application Ser. No. 13/207,375, entitled "METHOD AND SYSTEM FOR IMPLEMENTING A FAST CONVOLUTION FOR COMPUTING APPLICATIONS", all filed on Aug. 10, 2011, and which are all hereby incorporated by reference in their entirety.

FIELD

This disclosure concerns an architecture for performing sorting and bucketizing of alerts in a virtualization environment.

BACKGROUND

A "virtual machine" or a "VM" refers to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization allows one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

In many current applications, VMs are run in clusters, each of which may comprise dozens, hundreds, or even thousands of VMs located on multiple hosts or servers. Different VMs in the same cluster may be configured with different properties, such as amount of memory allocated to the VM, operating system run by the VM, etc.

At any given time, a number of VMs in the cluster may experience problems leading to errors or warnings, such as low memory, data corruption, etc. These errors or warnings may generate alerts, which can be received by a system administrator or other personnel. The system administrator may review the alerts in order to determine what type of remedial action to take. For example, a low-memory alert may be remedied by purchasing additional memory.

However, if a high number of alerts are received, it may be difficult for the system administrator to sort through the many alerts generated by the various VMs in the cluster. In addition, a system administrator may to determine common characteristics of the VMs that are generating alerts, in order to identify potential causes and solutions.

Therefore, there is a need for an improved approach to implement sorting and bucketization of alerts in a virtualization environment.

SUMMARY

Embodiments of the present invention provide an architecture for sorting and bucketizing alerts in a virtualization environment. In some embodiments, a plurality of alerts associated with virtual machines in the virtualization environment is received. A plurality of attributes may be identified for the virtual machines, and a plurality of buckets defined for each attribute, into which the received alerts are assigned. The buckets for each attribute are then sorted. The attributes may also be sorted based upon the distribution of alerts in the buckets of the attribute. In this way, a system administrator or other personnel may more easily determine which attributes of the virtual machines are correlated with the received alerts, in order to identify potential causes and solutions for the alerts in the virtualization environment.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

DETAILED DESCRIPTION OF THE EMBODIMENTS OF THE INVENTION

Embodiments of the present invention provide an improved approach for the sorting and bucketization of error and warning messages in a virtualization environment. According to some embodiments, a plurality of attributes is defined for each VM in a cluster. Each attribute be associated with one or more buckets. The different attributes and attribute buckets may be sorted such that a system administrator will be able to easily identify which attributes and buckets are most associated with the received errors, in order to better identify potential problems and solutions in the virtualization environment.

Figure 1:
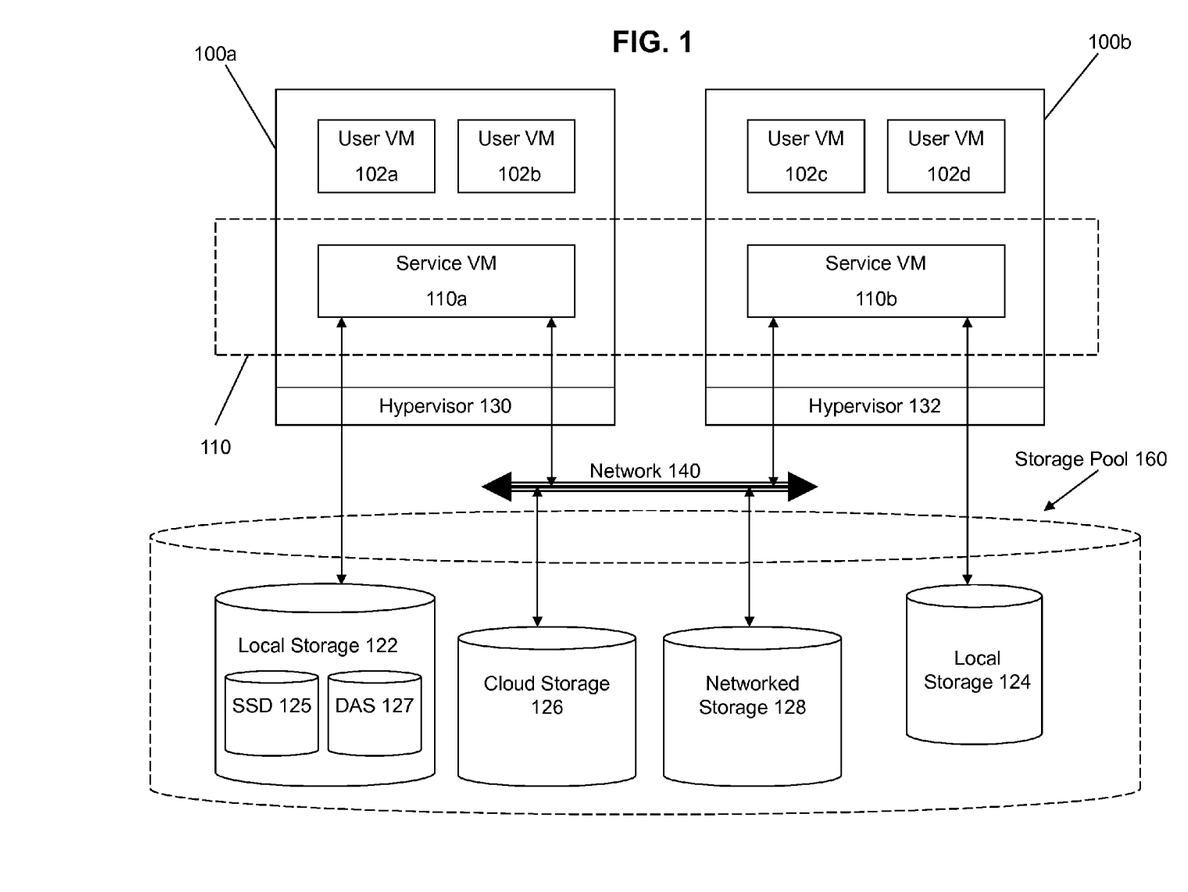
FIG. 1 illustrates an example architecture to implement I/O and storage device management in a virtualization environment according to some embodiments.

FIG. 1 illustrates an architecture for implementing storage management in a virtualization environment according to some embodiments. The architecture of FIG. 1 can be implemented for a distributed platform that contains multiple servers 100a and 100b that manages multiple-tiers of storage. The multiple tiers of storage may include storage that is accessible through a network 140, such as cloud storage 126 or networked storage 128 (e.g., a SAN or "storage area network"). Unlike the prior art, the present embodiment also permits local storage 122/124 that is within or directly attached to the server and/or appliance to be managed as part of the storage pool 160. Examples of such storage include Solid State Drives (henceforth "SSDs") 125 or Hard Disk Drives (henceforth "HDDs" or "spindle drives") 127. These collected storage devices, both local and networked, form a storage pool 160. Virtual disks (or "vDisks") can be structured from the storage devices in the storage pool 160, as described in more detail below. As used herein, the term vDisk refers to the storage abstraction that is exposed by a Service VM to be used by a user VM. In some embodiments, the vDisk is exposed via iSCSI ("internet small computer system interface") or NFS ("network file system") and is mounted as a virtual disk on the user VM.

Each server 100a or 100b runs virtualization software, such as VMware ESX(i), Microsoft Hyper-V, or RedHat KVM. The virtualization software includes a hypervisor 130/132 to manage the interactions between the underlying hardware and the one or more user VMs 102a, 102b, 102c, and 102d that run client software.

A special VM 110a/110b is used to manage storage and I/O activities according to some embodiment of the invention, which is referred to herein as a "Service VM". This is the "Storage Controller" in the currently described architecture. Multiple such storage controllers coordinate within a cluster to form a single-system. The Service VMs 110a/110b are not formed as part of specific implementations of hypervisors 130/132. Instead, the Service VMs run as virtual machines above hypervisors 130/132 on the various servers 102a and 102b, and work together to form a distributed system 110 that manages all the storage resources, including the locally attached storage 122/124, the networked storage 128, and the cloud storage 126. Since the Service VMs run above the hypervisors 130/132, this means that the current approach can be used and implemented within any virtual machine architecture, since the Service VMs of embodiments of the invention can be used in conjunction with any hypervisor from any virtualization vendor.

Each Service VM 110a-b exports one or more block devices or NFS server targets that appear as disks to the client VMs 102a-d. These disks are virtual, since they are implemented by the software running inside the Service VMs 110a-b. Thus, to the user VMs 102a-d, the Service VMs 110a-b appear to be exporting a clustered storage appliance that contains some disks. All user data (including the operating system) in the client VMs 102a-d resides on these virtual disks.

Significant performance advantages can be gained by allowing the virtualization system to access and utilize local (e.g., server-internal) storage 122 as disclosed herein. This is because I/O performance is typically much faster when performing access to local storage 122 as compared to performing access to networked storage 128 across a network 140. This faster performance for locally attached storage 122 can be increased even further by using certain types of optimized local storage devices, such as SSDs 125.

Further details regarding methods and mechanisms for implementing the virtualization environment illustrated in FIG. 1 are described in U.S. Pat. No. 8,601,473, which is hereby incorporated by reference in its entirety.

In some embodiments, a single cluster (e.g., as illustrated in FIG. 1) may comprise dozens, hundreds, or even thousands of entities or components, such as virtual machines (User VMs 102a, 102b, etc.). While the illustrated embodiments may refer primarily to VMs, it is understood that embodiments may be applied to any types of entities or components in a virtualization environment.

Figure 2:
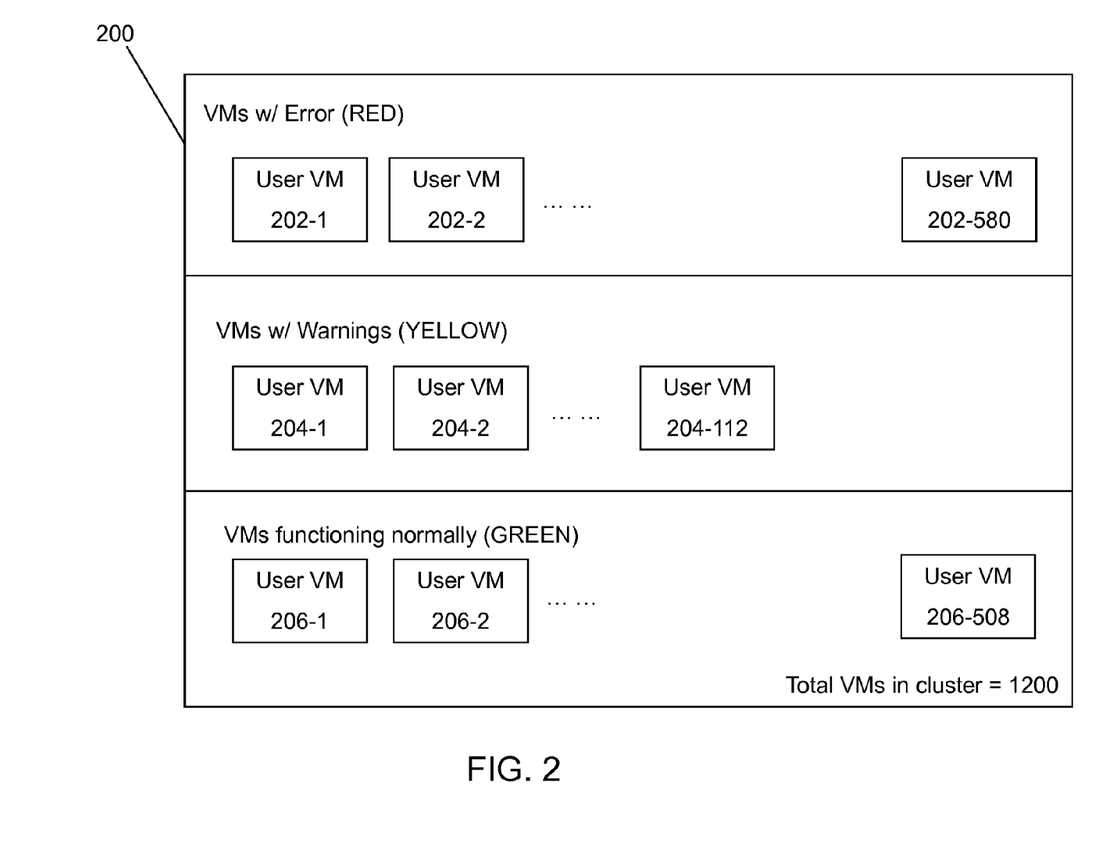
FIG. 2 illustrates a cluster of virtual machines from which alerts may be received in accordance with some embodiments.

At any given time, a portion of these VMs may be experiencing warnings or errors. For example, FIG. 2 illustrates a cluster 200 having 1200 virtual machines. Of the 1200 virtual machines, 580 virtual machines (202-1 through 202-580) are experiencing errors, 112 have warnings (204-1 through 204-112), while the remaining (508 VMs) are functioning normally (206-1, 206-508). In some embodiments, different levels of functioning may be labeled in different ways for easy identification and understanding (e.g., VMs experiencing problems may be labeled red or yellow, depending on the severity of the problem, while functioning VMs may be labeled green).

Figure 3:
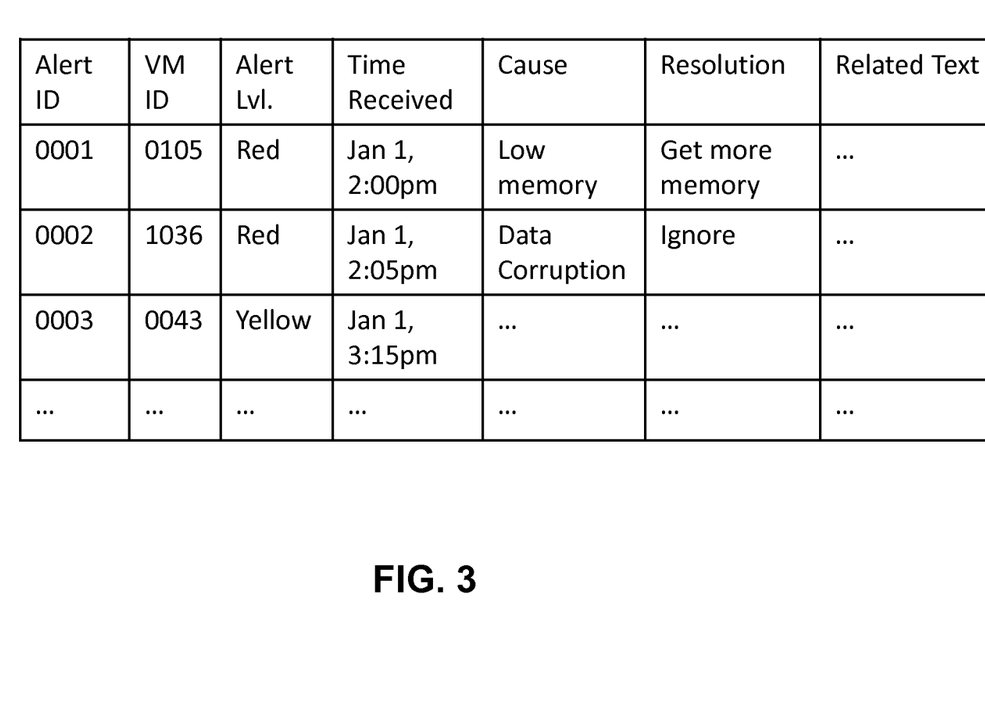
FIG. 3 illustrates a table of alerts in accordance with some embodiments.

In a traditional approach, problems experienced by the VMs in the cluster (e.g., errors or warnings) may cause alerts to be generated. These alerts may be displayed in a page for viewing by a system administrator or other personnel. FIG. 3 illustrates a table of alerts that may be displayed on such a page. The table may comprise a plurality of columns, containing alert information, which in some embodiments may include an alert ID number, an ID number of the VM from which the alert was generated, an alert level (e.g., red, yellow, etc.), an alert time stamp corresponding to when the alert was received or detected, an alert type or name (e.g., insufficient memory, corruption of data, etc.), an alert cause, an alert resolution, and/or other related text or information. In some embodiments, the system admin may click on different alerts to obtain additional details concerning the alert or to attempt to resolve the alert. The system admin may be able to sort the table based on individual columns. For example, if of the 580 errors, 578 are low memory errors, and 2 are data corruption errors, the system administrator may wish to sort the table by the "alert type" column in order to identify a solution that would solve the majority of the detected errors (e.g., buying more memory to resolve the low memory errors).

However, for large numbers of alerts, it can be very tedious for the system administrator to have to go through the various alerts on an individual level. In addition, it is desirable for the system administrator to be able to assess the possible causes and sources of alerts in order to be able to better resolve them. For example, if VMs of a particular type are experiencing problems, while VMs of different types are not (e.g., the majority of alerts are received from VMs residing on a particular host), a system administrator may be able to narrow the possible causes of the errors in order to identify potential solutions. On the other hand, if there is no strong correlation between a particular VM attribute and the number of received alerts (e.g., no strong correlation between amount of memory assigned to VM and the number of received alerts), then a system administrator may be able to rule out certain factors as the source of the received alerts.

In some embodiments, each entity in the cluster where an alert may occur (e.g., virtual machine) is associated with a plurality of attributes. It is noted that while the illustrated embodiments refer mainly to alerts being received for VMs in a cluster, other embodiments may be directed toward any type of entity or component in a virtualization environment cluster for which errors or alerts may be received (e.g., disks).

Figure 4:
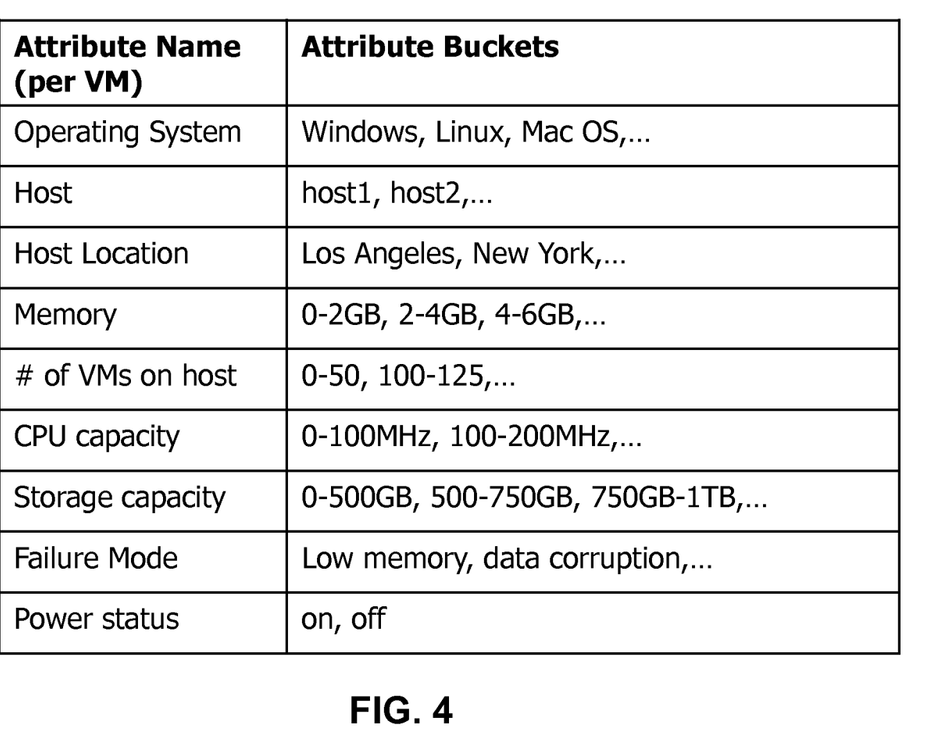
FIG. 4 illustrates a plurality of attributes that may be defined for virtual machines in a virtualization environment in accordance with some embodiments.

FIG. 4 illustrates a plurality of attributes that may be defined for the virtual machines in a cluster in accordance with some embodiments. These attributes may include the operating system used by the virtual machine (e.g., Windows, Linux, Mac OS, etc.), the particular host or server on which the virtual machine resides (e.g., host1, host2, etc.), the amount of memory for the virtual machine, whether the virtual machine is on/off at a given time, etc. Attributes may relate to properties of the particular virtual machine (e.g., operating system, memory, CPU capacity), properties of a host that the virtual machine resides on (e.g., host location, number of virtual machines on host), or to properties of the alert received from the particular virtual machine (e.g., failure mode). In some embodiments, attributes may include a combination of attributes (e.g., operating system and host). It is understood that any attributes or combinations of attributes may be used in various embodiments, which are not limited to those illustrated in FIG. 4.

For each attribute, a plurality of buckets or categories is defined. For example, for the operating system attribute, each bucket may correspond to a type of operating system run by the virtual machines (e.g., Windows, Linux, etc.). For other attributes, such as the memory attribute, the buckets may correspond to various ranges (e.g., a bucket for VMs having 0 to 2 GB of memory, another bucket for VMs having 2 to 4 GB of memory, etc.). It is noted that for buckets defined based upon ranges (e.g., memory size), the ranges corresponding to each bucket need not be constant or the same size (e.g., one bucket may be for VMs having 0 to 1 GB of memory, while another bucket is for VMs having 1 to 5 GB of memory). Once the buckets have been defined, the VMs may be placed into the appropriate bucket for each attribute. In some embodiments, a bucket may be sub-divided into additional buckets after the placement of VMs into the buckets. This may be done if a particular bucket is determined to be too broad and contains a disproportionate amount of VMs. In some embodiments, only VMs that are experiencing alerts are retrieved and placed into the appropriate buckets.

The attribute buckets may then be sorted to allow a system administrator to more easily identify attribute buckets associated with the received alerts. For example, in a particular embodiment, the buckets of each attribute may be sorted (e.g., from "worst" to "best"). In some embodiments, the "best" bucket in a particular attribute corresponds to the bucket associated with the least number of alerts, while the "worst" bucket is the bucket associated with the most number of alerts. In other embodiments, sorting may also take into consideration the total number of VMs associated with a bucket or a proportion of VMs associated with a bucket that are returning alerts. For example, a bucket with two VMs, wherein both VMs are returning alerts may be considered "worse" compared to a bucket having five VMs, three of which are returning errors, due to a higher proportion of VMs in the first bucket returning errors. In some embodiments, different types of alerts may be weighted different amounts of the purpose of sorting. For example, a red alert may be weighted more heavily than a yellow alert. In some embodiments, the weights assigned to the alerts may be based upon the particular attribute (e.g., a low memory alert may have a higher weight when sorting the "memory" attribute, but a lower weight with regards to sorting other attributes). In embodiments where only VMs experiencing alerts are placed into the buckets, the sorting may be done based upon the number of VMs in the buckets for the attribute, or a ratio of a number of VMs in a bucket associated with the attribute to a sum of the number of VMs in all buckets associated with the attribute.

In addition or in the alternative, the plurality of attributes may also be sorted (e.g. from "worst" to "best"). In some embodiments, an attribute may be considered to be "worse" than another attribute if the distribution of alerts between the different buckets of the attribute are more skewed or clumped into particular buckets. For example, if a particular attribute has 90% of the received alerts associated with one particular bucket, it may be considered to be "worse" than an attribute wherein the alerts are evenly distributed between the different buckets, as this may indicate a problem associated with the particular attribute as contributing to the cause of the alerts.

In some embodiments, the attributes may be sorted based upon a ratio of the number of alerts in the buckets of the attribute. In other embodiments, other measurements may be used, especially if the different attributes have different numbers of buckets. In some embodiments, the sorting may be based upon a distribution of alerts within the buckets of the attributes. For example, the sorting of attributes may be based upon a standard deviation of a distribution of alerts within the buckets of the attributes, wherein a lower standard deviation for an attribute may indicate the alerts being more concentrated in particular buckets in the attribute. Other factors may include skew, the number of buckets associated with the attribute, attribute weights, and/or the number of alerts in a bucket of the attribute having the most alerts. For example, certain attributes (e.g., the host the VM resides on) may be considered more important for diagnosing alerts and be weighted more heavily than other attributes. Thus the "host" attribute may be sorted above another attribute even if the distribution of alerts in the buckets of the "host" attribute is more even than the distribution in the other attribute. In some embodiments, attributes may be weighted differently depending on the type of alert. For example, the "memory" attribute may be weighted more heavily for "low memory" alerts, but not as heavily for "data corruption" alerts. These attribute and/or alert weights may be based upon a default value, and/or based upon one or more user inputs.

Figure 5A:
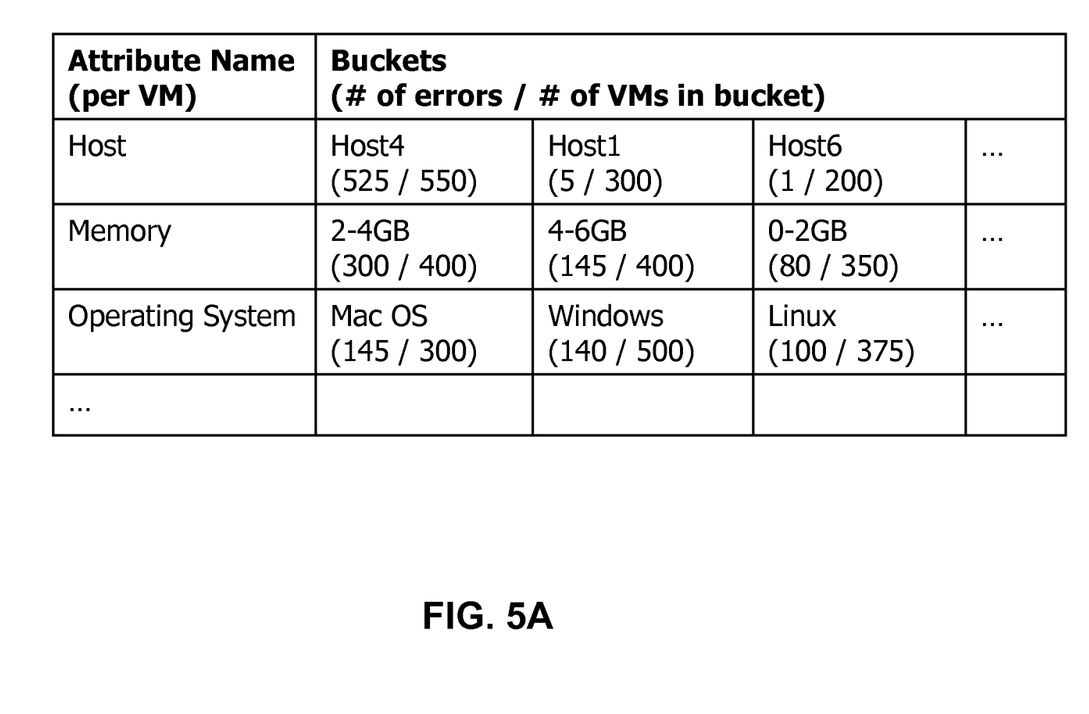
FIGS. 5A and 5B illustrates tables displaying the results of sorting of attributes and attribute buckets in accordance with some embodiments.

FIG. 5A illustrates an example page showing the results of the sorting of attributes and attribute buckets. The page may be formatted so that each row corresponds to a particular attribute, wherein the attribute buckets are sorted such that the "worst" buckets appear on the left. The attributes may be sorted such that the "worst" attributes appear at the top. Thus, the "worst" bucket of the "worst" attribute is configured to appear at the top left corner of the page, allowing the system administrator to easily identify which particular attributes are most associated with the received errors.

Figure 5B:
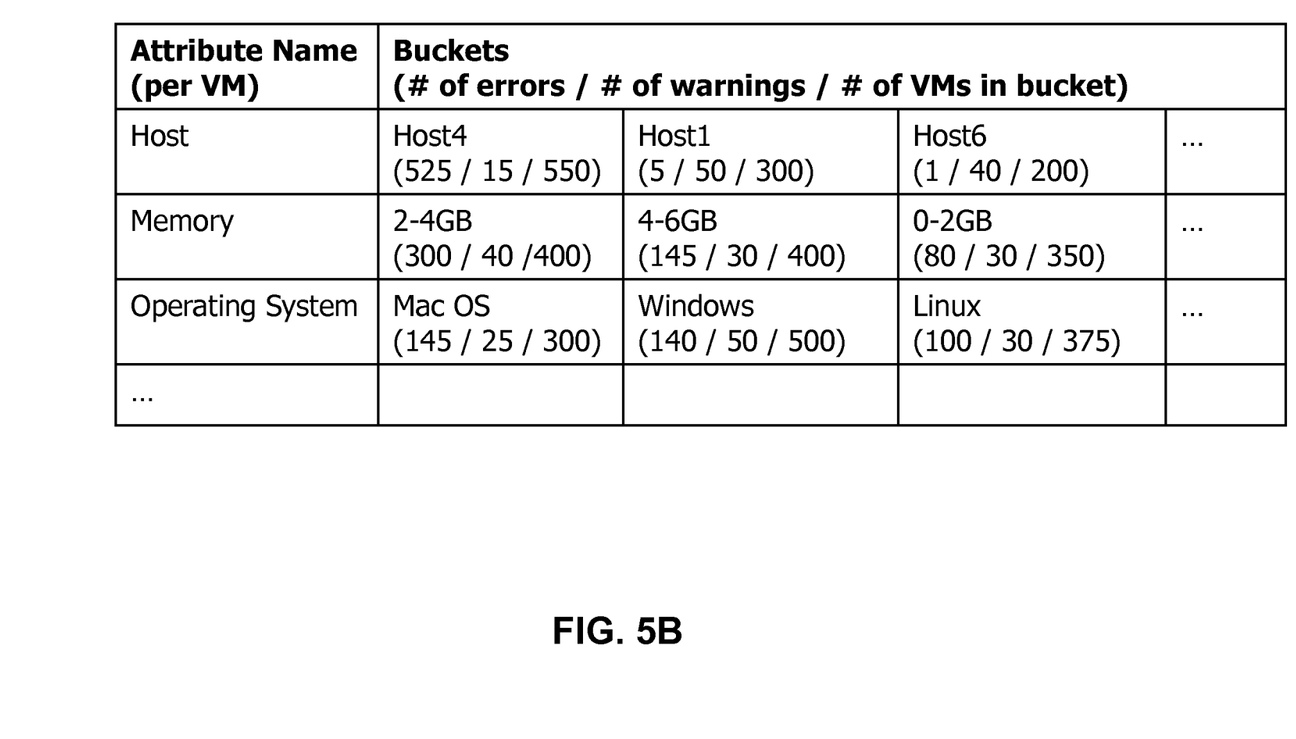

For example, as illustrated in FIG. 5A, the "host" attribute has the most uneven or skewed distribution of alerts amongst its attribute buckets, making the "host" attribute the "worst" attribute. Because "host4" is the bucket within the "host" attribute with the largest number of alerts, the "host4" bucket appears at the top left corner as the "worst" bucket of the attribute. From the page, the system administrator would be able to infer that a problem potentially exists with host4 that is causing the high number of alerts on that particular host. On the other hand, the system administrator may not be able to infer any particular correlation between the operating system attribute and the alerts, as the alerts are relatively evenly distributed among the different operating systems utilized by the VMs. In some embodiments, as illustrated in FIG. 5B, the attribute buckets may consider different levels of alerts when being sorted (e.g., errors and warnings). The sorting may be based upon errors only, both errors and warnings, a weighted combination of errors and warnings, or some other combination thereof. In some embodiments, a bar or other graphical element associated with each bucket may be shown to provide a visual indication of the proportion of VMs associated with the bucket that are experiencing alerts (e.g., a rectangular bar with a certain portion shaded red corresponding to a proportion of VMs returning alerts to total VMs associated with the bucket).

Figure 6:
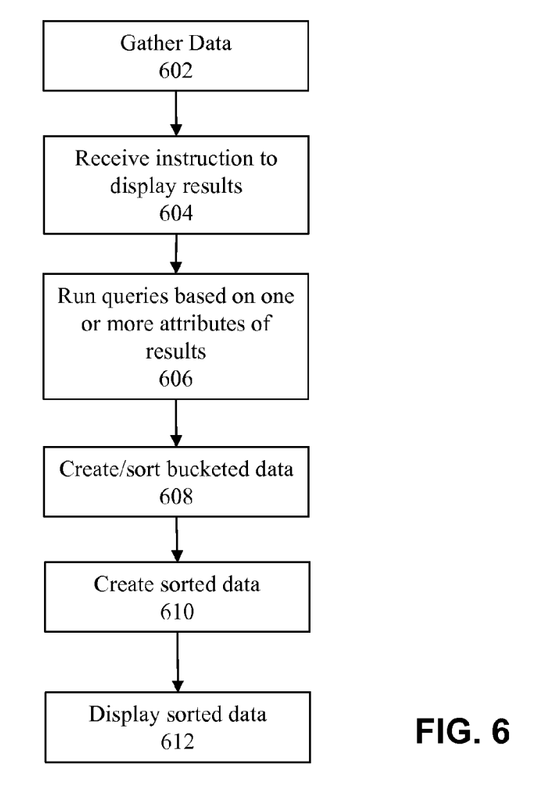
FIG. 6 illustrates a flowchart for a process for sorting and bucketizing alerts in a virtualization environment in accordance with some embodiments

FIG. 6 illustrates a flowchart for a process for sorting and bucketizing alerts in a virtualization environment in accordance with some embodiments. At 602, alert data from the plurality of VMs in the cluster is gathered or received. In some embodiments, gathering of alert data is overseen by a health management module (hereinafter referred to as a "Curator"). The purpose of the Curator is to oversee the overall state of the virtual storage system, and takes actions as necessary to manage the health and efficient performance of that system. Further details regarding methods and mechanisms for implementing a Curator are disclosed in U.S. Pat. No. 8,549,518, which is hereby incorporated by reference in its entirety.

At 604, instructions may be received regarding how the alert data is to be displayed. This may involve a system administrator selecting a plurality of attributes to sort the alert data by. In addition, the system administrator may define the buckets associated with each attribute. For example, for the "memory" attribute, corresponding to how much memory a particular VM has been allocated, the system administrator may configure the value ranges for the buckets (e.g., buckets that cover a 1 GB range, or buckets that cover a 2 GB range).

In some embodiments, the buckets are created based upon a distribution of VMs based on the attribute. For example, if n buckets are to be defined for the memory attribute, and query results are received for 1000 VMs, then the buckets may be defined such that each bucket covers a memory range that includes approximately 1000/n of the VMs, even though the size of the ranges covered by each bucket may be different. Thus by basing the bucket definitions at least partially upon an observed distribution VM attributes, a more even bucket distribution may be achieved in some embodiments.

In some embodiments, the instructions may also comprise filters for the alerts to be displayed. For example, a system administrator may only wish to view data on certain types of alerts (e.g., low memory alerts), or alerts of a certain severity (e.g., red). Other criteria, such as alert time-stamp, may also be used (e.g., to only analyze alerts that were received within a certain time period). By filtering the alerts before sorting and bucketizing, the workload of the system may be reduced.

Figure 7:
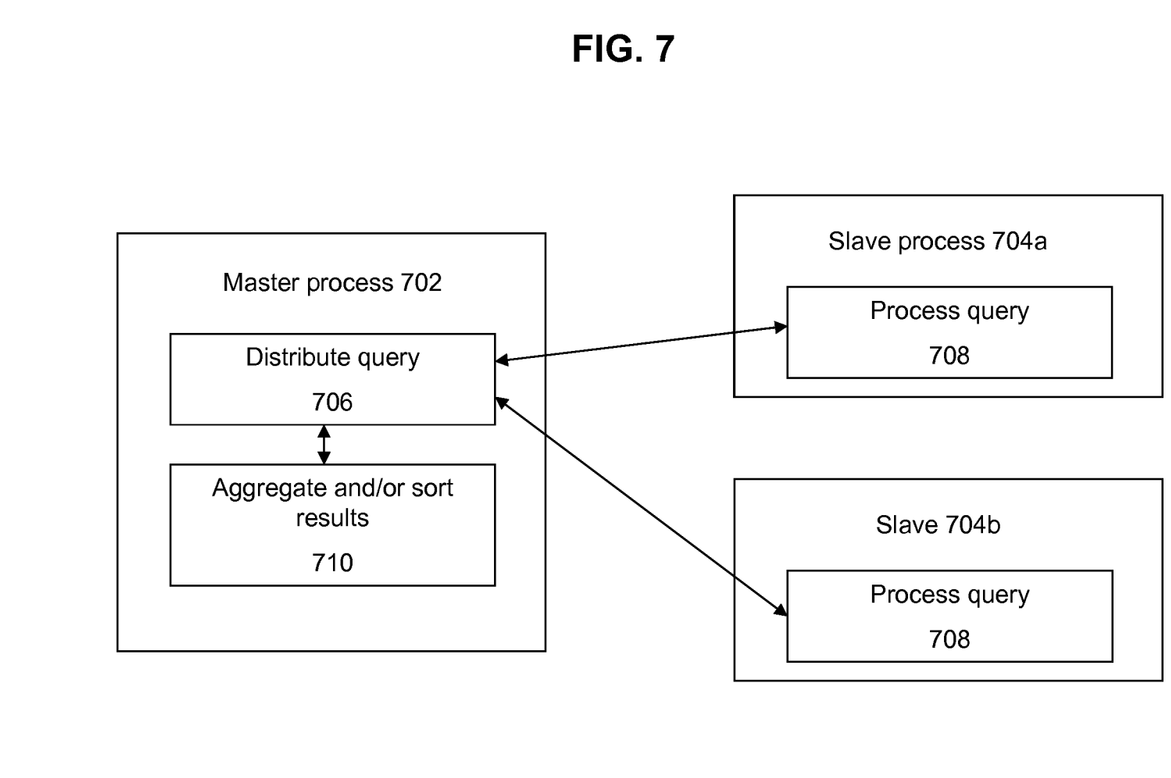
FIG. 7 illustrates a MapReduce function in accordance with some embodiments.

At 606, data for the selected attributes is retrieved. In some embodiments, the data may be retrieved by generating and executing a plurality of SQL queries on the gathered alert data and/or VM data, with GROUPBY clauses corresponding to the selected attributes. According to some embodiments, the curator uses a MapReduce function to operate on a distributed basis to manage and perform these functions, where a master process manages the workload that is performed by multiple slave processes. In some embodiments, the master process is run by a master curator on a first server node, while the slave processes are run by slave curators on other server nodes. For example, as shown in FIG. 7, one process will be elected as the master process 702 and will coordinate execution of the set of queries on the remaining processes, including slave processes 704a and 704b.

According to some embodiments, a MapReduce approach is taken to distribute workloads among the parallel processes. MapReduce is a framework that can be employed to process large workloads among a plurality of concurrent work entities. In general, map reduction operates by breaking the workload into different portions for separate processing, and then to utilize a shuffle phase to consolidate and process the processing results. Further details regarding methods and mechanisms for implementing MapReduce functions are disclosed in U.S. Pat. No. 8,549,518, which is hereby incorporated by reference in its entirety.

The master process 702 takes the list of queries, and, at 706, divides up the work among the different slave processes (704a, 704b) in the system, attempting to parallelize work across the slave processes in the cluster. Each slave process 704 then processes its share of the workload at 708. The master process 702 may use RPCs (remote procedure calls) to send instructions to the different slave processes (704a, 704b) to perform the workload. RPCs are sent to the different processes in the cluster (including itself) to perform specific actions (e.g., running a map or reduce task assigned to it by the master). In some embodiments, each process executes the full set of queries against a subset of the data (e.g., the alert data). For example, in some embodiments each host may have a process that executes the set of queries against a subset of the alert data (e.g., the set of alerts originating from that host). In other embodiments, the slave processes may each execute a subset of the queries against the entire set of alert data. Each slave process 704 then returns its results to the master process 702.

At 608, bucketed data is created based upon the query results received at 606. In some embodiments, the buckets may have already been defined (e.g., at 604). In some embodiments, the master process 702 is responsible for aggregating the data received from the slave processes 704 at 710. In addition, the master process 702 may also sort the bucketized data from each of the selected attributes. As described above, the buckets of individual attributes may be sorted based upon the number of alerts associated with the buckets, the ratio of VMs associated with a bucket having alerts to those that do not, and/or weights of the alerts assigned to the buckets. At 610, the bucketized attributes are sorted. As described above, the attributes may be sorted by bucket alert ratios, standard deviation, skew, or other factors or a combination thereof.

At 612, the sorted bucketized data is displayed. In some embodiments, the displayed data may be in the form of a grid as illustrated in FIG. 5. In some embodiments, the display may include charts or other graphical elements illustrating the distribution of alerts within a category. Using the displayed data, a system administrator is able to view the distribution of alerts amongst the VMs of the virtualization environment having certain characteristics, aiding in the identification of potential causes and solutions for the alerts.

Therefore, what has been described is an improved architecture for sorting and bucketizing alerts in a virtualization environment. According to some embodiments, a plurality of attributes is defined for the VMs of a virtualization environment. A plurality of buckets may be defined for each attribute, to which the received alerts are assigned. By sorting the buckets of each attribute, and sorting the plurality of attributes, a system administrator may be able to better identify potential sources of error causing the alerts in the virtualization environment.

System Architecture

Figure 8:
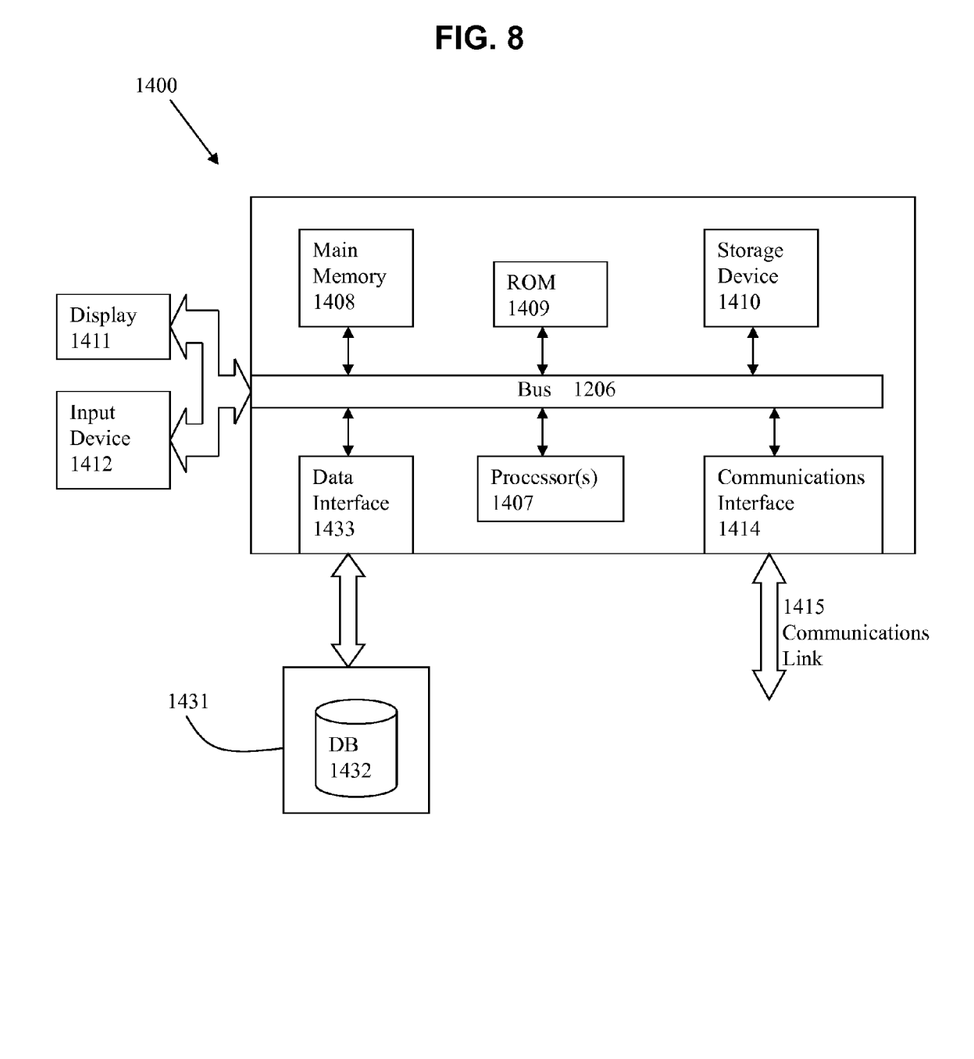
FIG. 8 illustrates a block diagram of a computing system suitable for implementing an embodiment of the present invention.

FIG. 8 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer-implemented method for managing alerts in a virtualization environment, comprising:
   receiving alerts associated with entities in the virtualization environment;
   identifying attributes associated with the entities;
   defining buckets associated with the attributes, wherein a bucket corresponds to a value or value range of an attribute;
   assigning the entities and their corresponding alerts into the buckets associated with the attributes;
   for an attribute, sorting the buckets associated with the attribute, based at least in part upon a number of alerts assigned to the buckets;
   sorting the attributes based at least in part upon a distribution of alerts assigned to the buckets associated with the attributes.

2. The computer-implemented method of claim 1, further comprising filtering the alerts.

3. The computer-implemented method of claim 2, wherein the alerts are filtered based at least in part upon an alert type, an alert level, or an alert time.

4. The computer-implemented method of claim 1, wherein defining buckets associated with an attribute is based at least in part upon a distribution of entities based upon the attribute.

5. The computer-implemented method of claim 1, wherein sorting the buckets associated with the attribute is based at least in part upon a ratio of a number of alerts assigned to a bucket associated with the attribute to a total number of alerts assigned to all buckets associated with the attribute.

6. The computer-implemented method of claim 1, wherein sorting the attributes is based at least in part upon a standard deviation of the distribution of alerts assigned to the buckets associated with the attributes.

7. The computer-implemented method of claim 1, further comprising identifying a plurality of weights associated with the attributes, and wherein sorting the attributes is based at least in part upon the plurality of weights.

8. The computer-implemented method of claim 1, wherein assigning the entities and their corresponding alerts into the buckets comprises generating a plurality of queries for the entities based at least in part upon the values or value ranges corresponding to the buckets.

9. The computer-implemented method of claim 8, further comprising using a MapReduce function to:
- distribute the plurality of queries to a plurality of processes;
- receive query results from the plurality of processes; and
- consolidate the received query results.

10. A system for managing alerts in a virtualization environment, comprising:
- a computer processor to execute a set of program instructions;
- a memory to hold the program code instructions, in which the program code instructions comprises program code to perform:
  - receiving alerts associated with entities in the virtualization environment;
  - identifying attributes associated with the entities;
  - defining buckets associated with the attributes, wherein a bucket corresponds to a value or value range of an attribute;
  - assigning the entities and their corresponding alerts into the buckets associated with the attributes;
  - for an attribute, sorting the buckets associated with the attribute, based at least in part upon a number of alerts assigned to the buckets;
  - sorting the attributes based at least in part upon a distribution of alerts assigned to the buckets associated with the attributes.

11. The system of claim 10, wherein the program code further performs filtering the alerts.

12. The system of claim 11, wherein the alerts are filtered based at least in part upon an alert type, an alert level, or an alert time.

13. The system of claim 10, wherein defining buckets associated with an attribute is based at least in part upon a distribution of entities based upon the attribute.

14. The system of claim 10, wherein sorting the buckets associated with the attribute is based at least in part upon a ratio of a number of alerts assigned to a bucket associated with the attribute to a total number of alerts assigned to all buckets associated with the attribute.

15. The system of claim 10, wherein sorting the attributes is based at least in part upon a standard deviation of the distribution of alerts assigned to the buckets associated with the attributes.

16. The system of claim 10, wherein the program code further performs identifying a plurality of weights associated with the attributes, and wherein sorting the attributes is based at least in part upon the plurality of weights.

17. The system of claim 10, wherein assigning the entities and their corresponding alerts into the buckets comprises generating a plurality of queries for the entities based at least in part upon the values or value ranges corresponding to the buckets.

18. The system of claim 17, wherein assigning the entities and their corresponding alerts into the buckets further comprises using a MapReduce function to:
- distribute the plurality of queries to a plurality of processes;
- receive query results from the plurality of processes; and
- consolidate the received query results.

19. A computer program product embodied in a non-transitory computer readable medium, the computer readable medium having stored thereon a sequence of instructions which, when executed by a processor causes the processor to execute a process to validate database table partitioning schemes using stratified random sampling, the process comprising:
- receiving alerts associated with entities in the virtualization environment;
- identifying attributes associated with the entities;
- defining buckets associated with the attributes, wherein a bucket corresponds to a value or value range of an attribute;
- assigning the entities and their corresponding alerts into the buckets associated with the attributes;
- for an attribute, sorting the buckets associated with the attribute, based at least in part upon a number of alerts assigned to the buckets;
- sorting the attributes based at least in part upon a distribution of alerts assigned to the buckets associated with the attributes.

20. The computer program product of claim 19, wherein the process further comprises filtering the alerts.

21. The computer program product of claim 20, wherein the alerts are filtered based at least in part upon an alert type, an alert level, or an alert time.

22. The computer program product of claim 19, wherein defining buckets associated with an attribute is based at least in part upon a distribution of entities based upon the attribute.

23. The computer program product of claim 19, wherein sorting the buckets associated with the attribute is based at least in part upon a ratio of a number of alerts assigned to a bucket associated with the attribute to a total number of alerts assigned to all buckets associated with the attribute.

24. The computer program product of claim 19, wherein sorting the attributes is based at least in part upon a standard deviation of the distribution of alerts assigned to the buckets associated with the attributes.

25. The computer program product of claim 19, wherein the process further comprises identifying a plurality of weights associated with the attributes, and wherein sorting the attributes is based at least in part upon the plurality of weights.

26. The computer program product of claim 19, wherein assigning the entities and their corresponding alerts into the buckets comprises generating a plurality of queries for the entities based at least in part upon the values or value ranges corresponding to the buckets.

27. The computer program product of claim 26, wherein assigning the entities and their corresponding alerts into the buckets further comprises using a MapReduce function to:
- distribute the plurality of queries to a plurality of processes;
- receive query results from the plurality of processes; and
- consolidate the received query results.

* * * * *